United States Patent [19]

Westerman et al.

[11] Patent Number: 4,987,700
[45] Date of Patent: Jan. 29, 1991

[54] MECHANICAL SCARFING APPARATUS

[75] Inventors: Everett A. Westerman, Auburn; Phillip E. Roll, Kent, both of Wash.

[73] Assignee: The Boeing Company, Seattle, Wash.

[21] Appl. No.: 284,137

[22] Filed: Dec. 13, 1988

[51] Int. Cl.⁵ .............................................. B24B 7/00
[52] U.S. Cl. .................................... 51/34 E; 51/34 G; 51/35; 51/90; 51/166 TS; 51/166 FB; 51/120; 51/241 B
[58] Field of Search .................. 51/34 C, 34 E, 34 G, 51/35, 90, 166 TS, 166 FB, 119, 120, 241 A, 241 B, 241 S

[56] References Cited
U.S. PATENT DOCUMENTS

| | | |
|---|---|---|
| 2,480,354 | 12/1945 | Bonnet . |
| 2,638,136 | 5/1948 | Miller . |
| 2,718,732 | 9/1955 | Comstock, 3rd ........................ 51/35 |
| 3,910,159 | 10/1975 | Gladwin . |
| 4,061,077 | 12/1977 | Gladwin . |
| 4,375,738 | 3/1983 | Bando ................................... 51/119 |
| 4,610,586 | 9/1986 | Langeder . |
| 4,614,466 | 9/1986 | Snyder . |

FOREIGN PATENT DOCUMENTS

| | | |
|---|---|---|
| 2749287 | 5/1979 | Fed. Rep. of Germany . |
| 112701 | 2/1979 | Japan . |
| 537762 | 12/1976 | U.S.S.R. . |

Primary Examiner—Frederick R. Schmidt
Assistant Examiner—Jack W. Lavinder
Attorney, Agent, or Firm—Seed and Berry

[57] ABSTRACT

The present invention contemplates an apparatus for producing a controlled taper cut in a workpiece. The apparatus includes a plurality of horizontal support members for supporting a slidable gantry member and a rotatable support member disposed within the gantry member in a substantially vertical position. The rotatable vertical support member is adjustable in a vertical direction within the gantry member. A router support beam is pivotally attached to the distal end of the vertical support member at the approximate midsection of the router support beam. The apparatus also includes a cutting tool slidably mounted from the support beam.

8 Claims, 12 Drawing Sheets

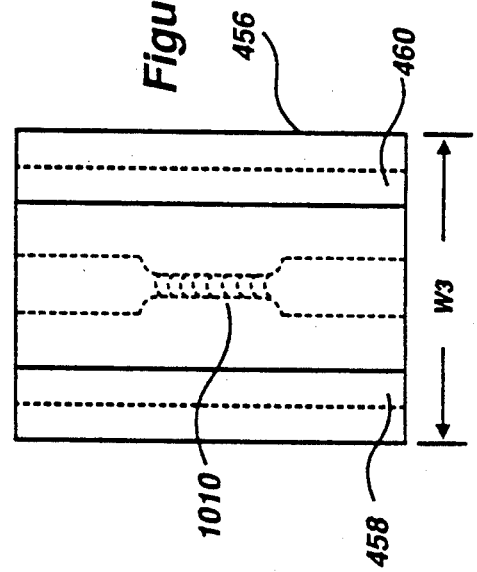
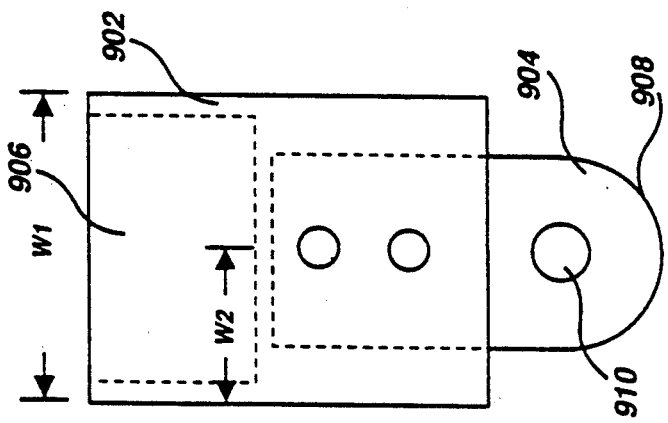

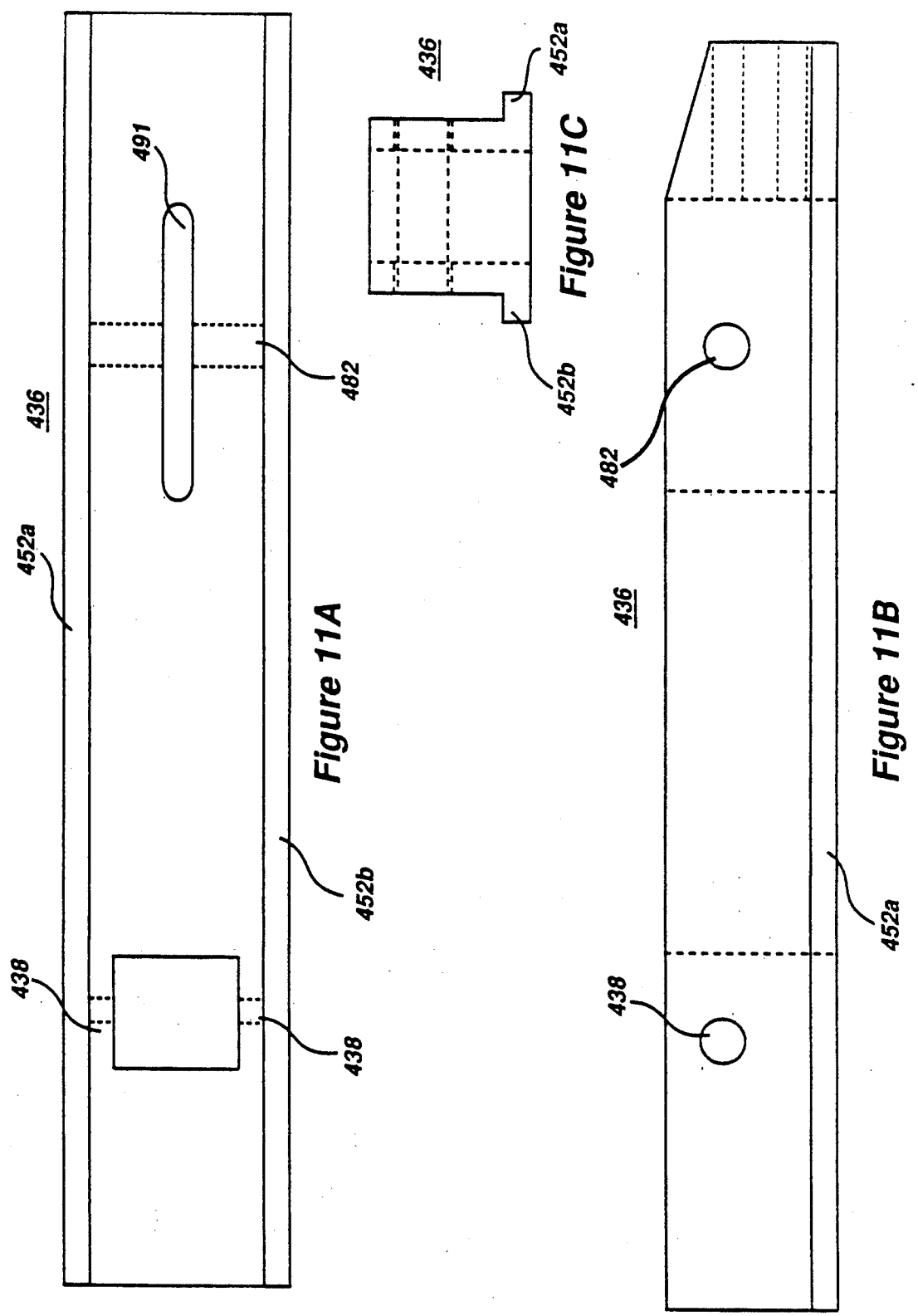

MECHANICAL SCARFING APPARATUS

FIELD OF THE INVENTION

This invention relates to the field of tool guides and more particularly to a tool guide for routers which produces a a wide variety of cuts including substantially tapered circular cuts in spherical or curvilinear surfaces.

BACKGROUND OF THE INVENTION

Tool guides are well known devices which provide a user control of a cutting instrument in precision applications. While various tool guides are known, tool guides which are adaptable for use on curvilinear or structures surfaces pose significant problems. This is because most known tool guides rely on nonadjustable linear supports which are not readily adapted for the generation of controlled complex movement.

Precise control of a cutting instrument is particularly important with structures constructed of composite materials which may be laminated in several layers. Each layer of a composite construction is typically formed with plies of carbon or fiberglass fiber material which is bonded to the other layers with a resinous material such as epoxy. This construction poses several problems in repairing damaged composite components while providing all the structural integrity of the original component, because loads in these materials are carried by the fiber layers and can be prone to delamination if damaged.

The repair of composite materials requires that any damaged area be removed, thus exposing each of the fiber layers for bonding to new material. Typically, damaged composite material is removed with a process known as scarfing. Scarfing provides a region surrounding a damaged area having beveled or angled walls to receive new composite material and provide a contact surface for each fiber layer. While known tools have been developed for scarfing flat surfaces, additional damage or alteration to the structure is incurred. These tools cannot be used with complex structures. Today, spherical or curved surfaces are scarfed by hand sanding and grinding.

One example of an apparatus for supporting a cutting instrument is shown in Soviet Union Inventor's certificate No. 537,762, issued 1977. This device is a router mounted on the end of a shaft, wherein the angle of the router is adjusted by an adjustment arm. While this device can create complex shapes, there is no provision for moving the router mechanism in a lateral direction. Furthermore, there is no provision to control the field of motion or depth of cut for the router assembly, and non-circular cutouts cannot be prepared Another example of an apparatus for supporting a cutting instrument is shown in U.S. Pat. No. 2,638,136, issued 1953. This device includes a routing element which is supported with a plurality of cross supports over a work piece. In this invention, the cross support members restrict movement of the router to a single plane which is perpendicular to the cross support members. Therefore, this invention is not adapted for creating tapered or spherical shapes and is limited to curvilinear shapes. In addition, oval or non-circular cutouts cannot be prepared.

Still another example of an apparatus for supporting a cutting instrument is shown in U.S. Pat. No. 4,614,446, issued 1986. This invention produces a curvilinear cut following a specific radius determined by the rails or tracks used. This invention is non-adjustable except by repositioning the entire support fixture. This invention cannot prepare a tapered hole or cut.

From the foregoing, no adjustable device is known which supports a router or other type of cutting tool to generate precise cuts of virtually any desired shape, angle and depth. The present invention is fully adjustable to produce tapered cuts which may be circular, oval, spherical, or substantially rectangular.

SUMMARY OF THE INVENTION

Briefly described, the present invention contemplates an apparatus for producing a controlled taper cut in a workpiece including a plurality of horizontal support members and means for supporting the horizontal members in a fixed position over the workpiece. A gantry member is slidably disposed on the horizontal support members and a rotatable support member is disposed within the gantry member in a substantially vertical position. The rotatable vertical support member includes means for adjusting the vertical position of the rotatable vertical support member within the gantry member. A router support beam is pivotally attached to the distal end of the vertical support member at the approximate midsection of the router support beam and a means for controlling the angular relationship of the router support beam with respect to the horizontal axis defined by the horizontal support members is coupled between the rotatable vertical support member and one end of the support beam. The present invention further includes means for slidably supporting a cutting tool from the support beam.

Accordingly, it is an object of the present invention to provide a method and means for generating tapered cuts tangent to the surface of a complex structure.

It is another object of the present invention to provide a method and means for precise control of a cutting instrument on a variety of surfaces It is still another object of the present invention to provide a method and means for mechanically producing tapered cuts in a complex surface with precisely control over the depth, quality and angle of the cut.

BRIEF DESCRIPTION OF THE DRAWINGS

These and other objects will be fully appreciated through the specific and the accompanying Figures of drawing in which:

FIG. 9 is a side view of the means for coupling the vertical support members and the suction means which attach the present scarfing apparatus to a workpiece.

FIGS. 10A through 10C are a plurality of views of the slidable block assembly which interfaces the routing means to the support beam.

FIGS. 11A through 11C are a plurality of views of one support beam adapted for use with the present invention.

DETAILED DESCRIPTION OF THE INVENTION

Modern aircraft are increasingly incorporating composite materials in the construction of a variety of components. New composite materials offer extremely high strength with light weight. The weight/strength ratio of many composite materials exceeds that of many metals used in the construction of aircraft. In the future, the majority of structural components used in aircraft may be constructed with composite materials.

While providing many advantages in terms of strength and weight, composite materials pose unique problems when attempting to repair damaged areas. Since composite materials are composed of a plurality of layers, damaged areas are prone to ply delamination. In addition, since loads in composite materials are carried by the fibers of the composite material, a structure to be repaired must be carefully cut with tapered walls to expose each respective layer of fiber for bonding to replacement material.

Figure 1A:
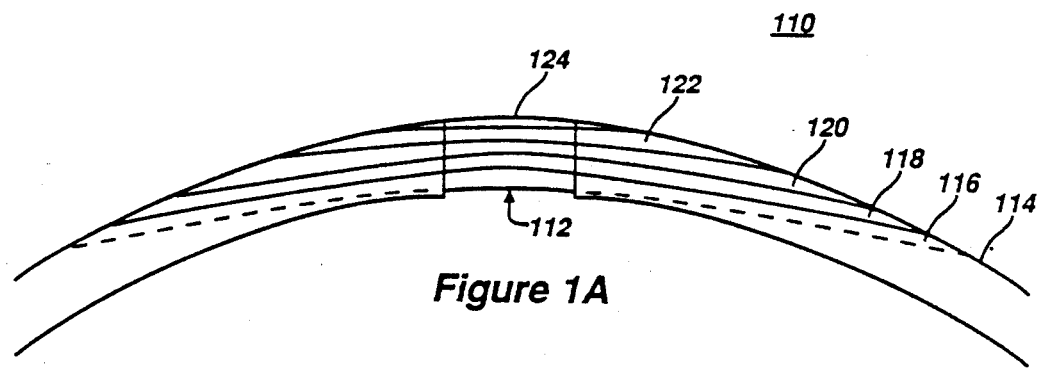
FIGS. 1A and 1B are cross-sectional views of typical curvilinear sections with the scarfing apparatus of the present invention.
Figure 1B:
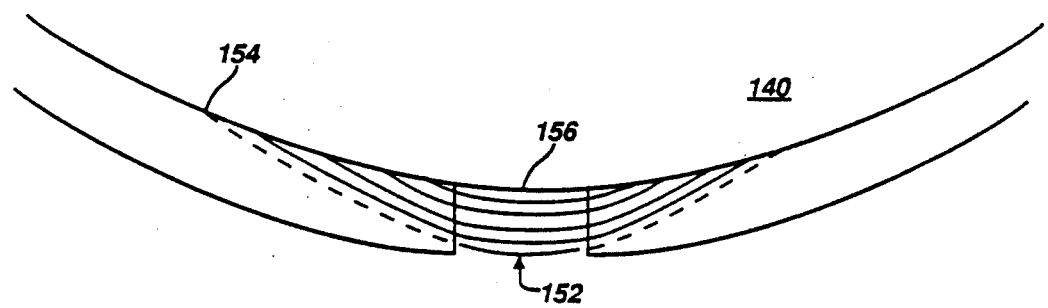

Referring now to FIGS. 1A through 2B, a plurality of cross-sectional views of typical repaired regions in composite constructions are shown. FIG. 1A shows a cutaway view of a curvilinear composite construction 110 which is representative of a leading edge or fuselage of an aircraft. FIG. 1A shows a negative taper angle repair wherein a damaged area 112 is repaired by removing an exterior area of material defined by the taper cut 114. A plurality of repair plies 116, 118, 120, 122 and 124 are then applied as individual layers which conform to the angle of taper cut 114. Each of the respective repair ply layers may be bonded together with an adhesive such as epoxy and could be cured with a heat curing process prior to application of the next respective layer or after all layers have been applied. Materials for the repair plies and the adhesives used therewith are well known to those skilled in the art. A sufficient number of ply layers are deposited until the repaired area is substantially the same thickness as the composite construction 110.

Figure 2A:
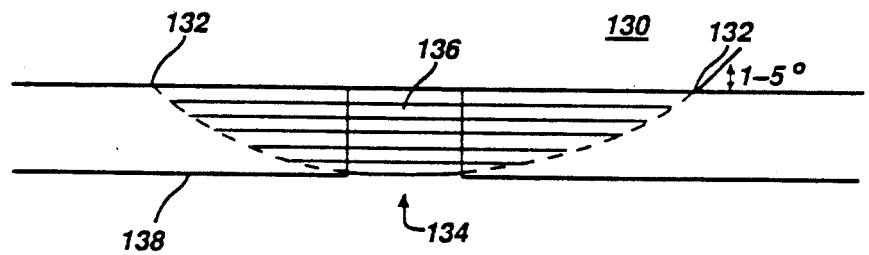
FIGS. 2A and 2B are cross-sectional views of typical repairs showing the plane regions prepared with the scarfing apparatus of the present invention.

Referring now to FIG. 2A, an alternate method for repairing the curved composite construction 10. This technique provides an extreme positive taper angle repair wherein a damaged area 152 is repaired by removing an interior area of material defined by the taper cut 154. A plurality of repair plies 156 are applied over the damaged region 152 by conventional means wherein the repair plies substantially conform to the shape of the taper cut 154.

Referring now to FIG. 2A, a spherical taper cut repair in a substantially plane composite section 130 is shown. In this type of repair, a circular taper cut 132 is provided to remove the material surrounding the damaged area 134. A plurality of repair plies 136 of increasing cross-section with respect to the surface 138 are applied as individual layers wherein the ends of each respective layer conform to the angle of spherical taper cut 132. A sufficient number of ply layers are deposited until the repaired area is substantially the same thickness as the composite construction 130. In this type of repair, the taper cut 132 is disposed with an angle of approximately 1°-5° with respect to the horizontal axis of member 130.

Figure 2B:
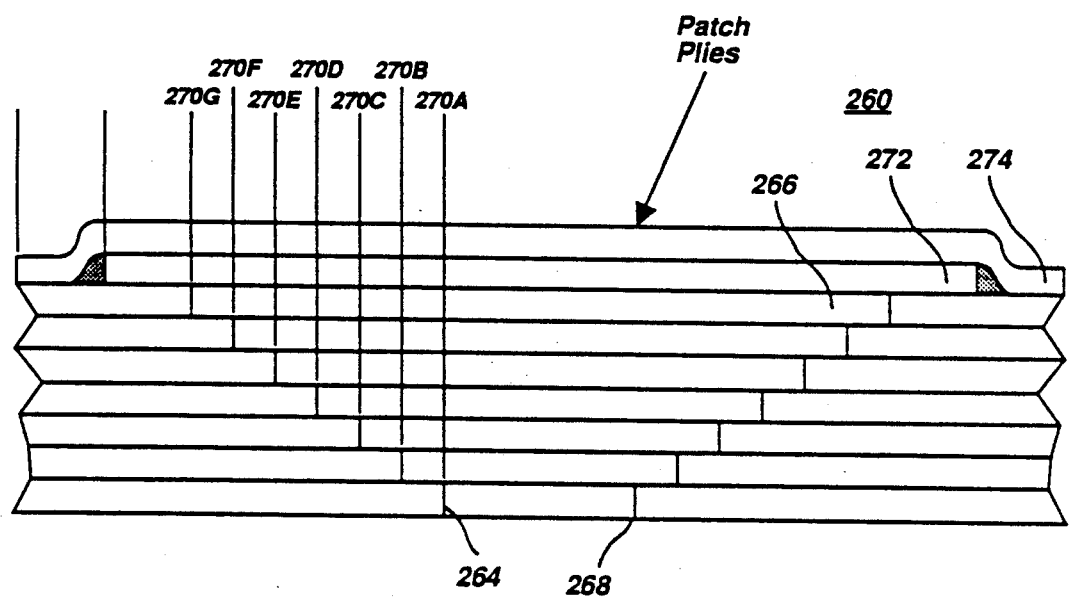

FIG. 2B is a cross-section of a typical stepped repair in a composite structure 260. The composite structure 260 comprises seven plies wherein each respective ply is cut in a stepped or terraced manner surrounding the damaged area 262 in the area defined by cut 264. Repair plies 266 are prepared to conform substantially to the shape of the stepped area defined by steps 270A through 270G. A plurality of additional plies 272, 274 are then placed over the repaired area to secure the repair plug 266. The repair plies 266 are further secured in place with a layer of adhesive 268 disposed at the junction of the repair plug 266 and the composite structure 260.

The present invention is particularly adapted for generating the taper or stepped cuts in each of the applications described above and is readily adapted for use with both curved and flat composite constructions or other types of materials.

Figure 3:
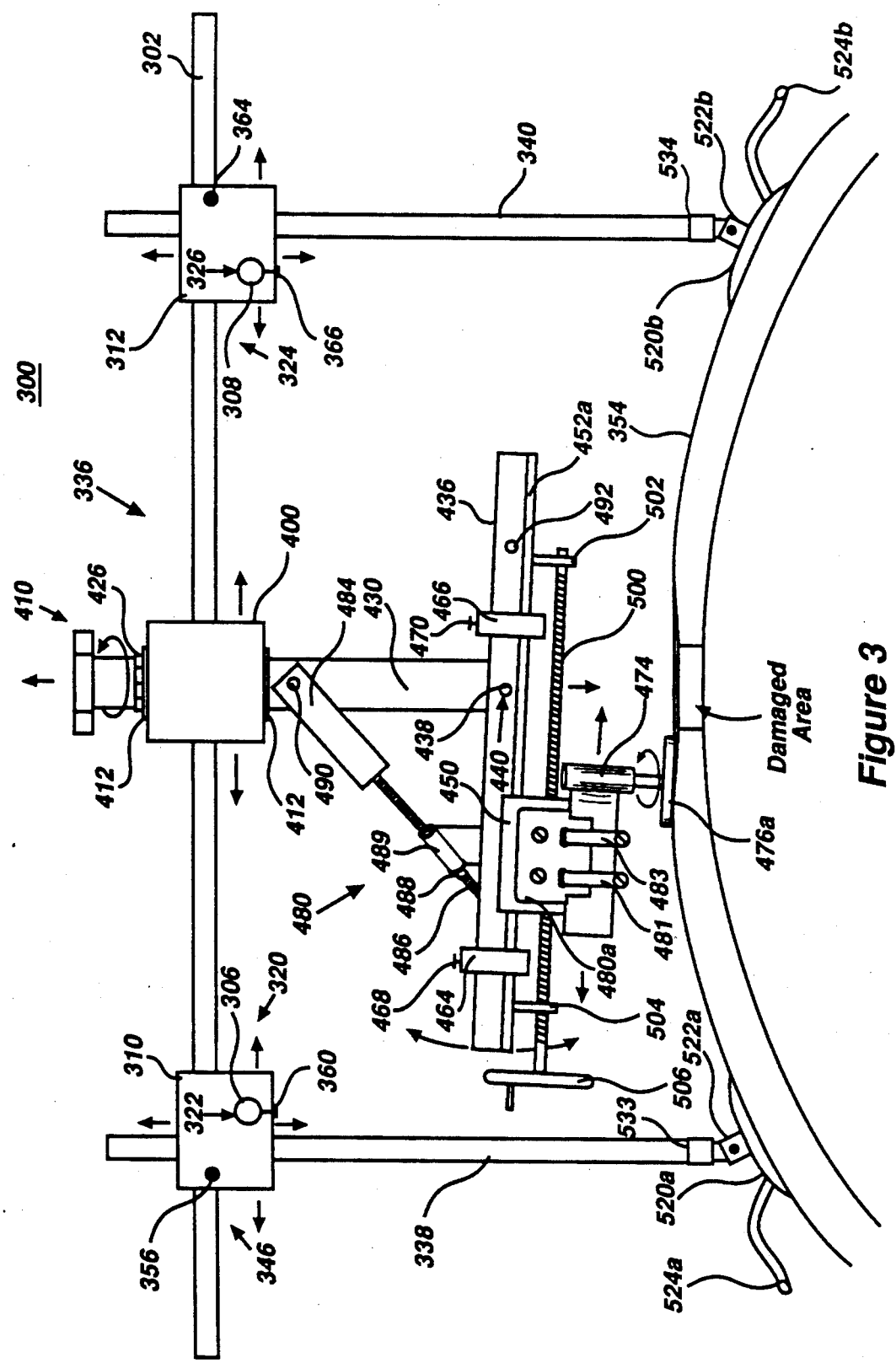
FIG. 3 is a side view of the mechanical scarfing apparatus of the present invention.
Figure 4:
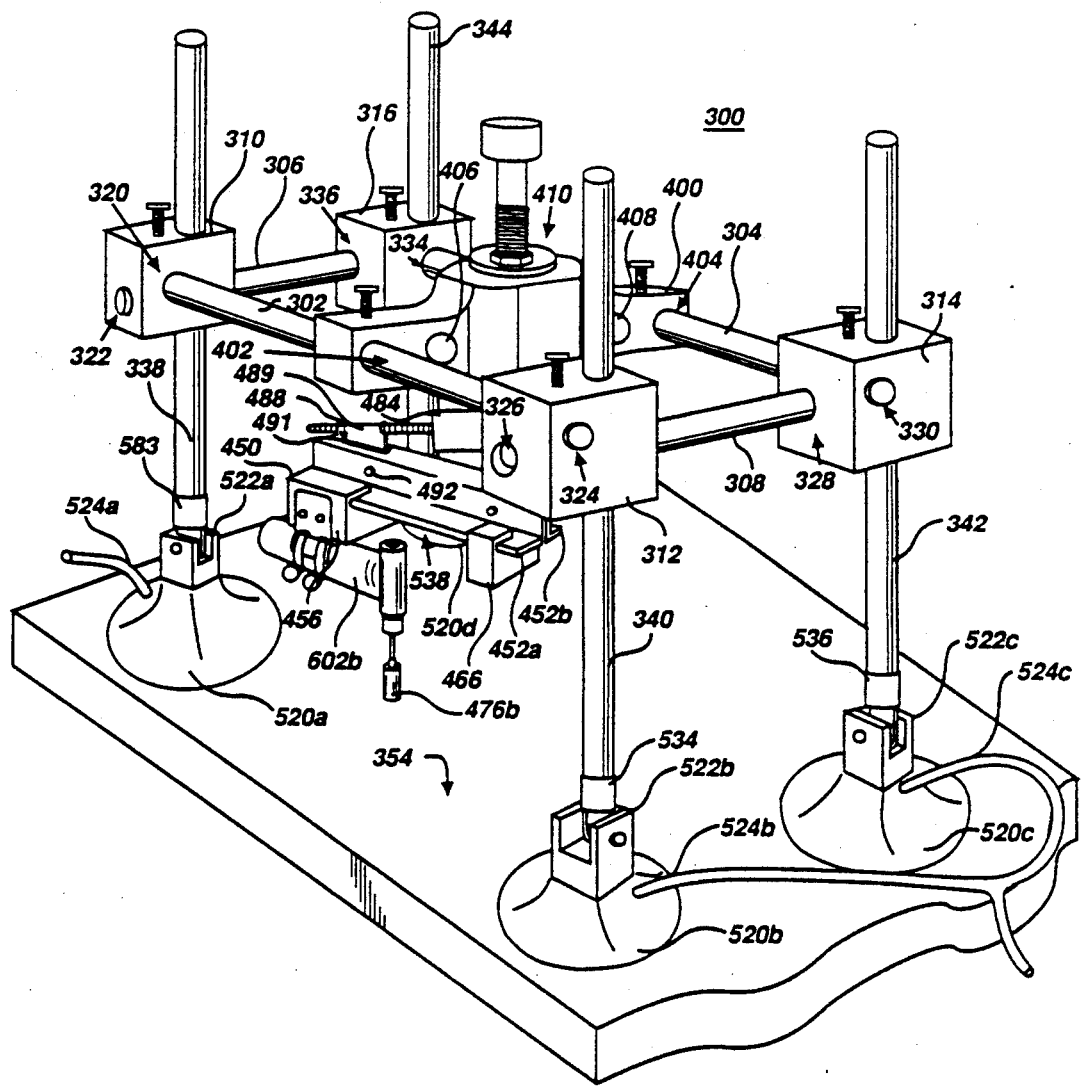
FIG. 4 is an isometric view of the mechanical scarfing apparatus of the present invention set-up in a slightly different arrangement than the apparatus of FIG. 5.
Figure 5:
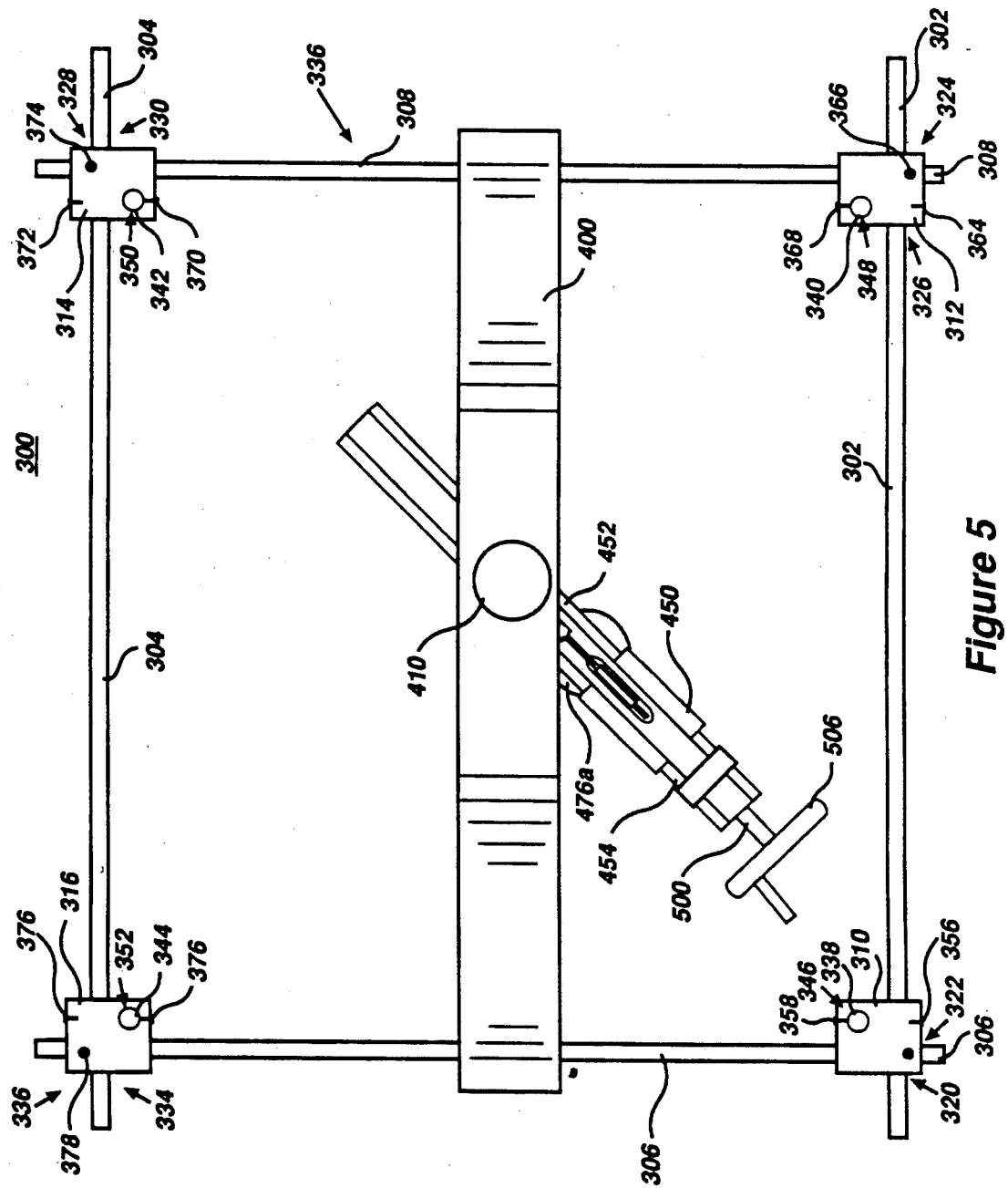
FIG. 5 is a top plan view of the mechanical scarfing the present invention.

Referring now to FIGS. 3 through 5, the mechanical scarfing apparatus of the present invention is shown. The mechanical scarfing apparatus 300 includes a plurality of horizontal cross support members 302 and 304 and a plurality of frame members 306 and 308 disposed in the other horizontal plane with respect to cross support members 302 and 304. The cross support members 302 and 304 are coupled to the frame members 306 and 308 with adjustable blocks 310, 312, 314 and 316 which receive the respective members in bores 320, 322; 324,326; 328,330; and 332, 334, respectively, thus forming a support frame 336. A plurality of vertical support members 338, 340, 342 and 344 are coupled to the support frame 336 and are received in the adjustable blocks 310, 312, 314 and 316 through bores 346, 348, 350 and 352, respectively. The vertical support members 338, 340, 342 and 344 suspend the support frame 336 over a workpiece 354 which is shown as a curvilinear member in FIG. 3 and a plane member in FIG. 5. Each of the respective cross support members 302,304, the frame members 306,308 and the vertical support members 338, 340, 342 and 344 are held in position within the adjustable blocks 310, 312, 314 and 316 with set screws; set screws 356, 358 and 360 secure adjustable block 310, set screws 364, 366, and 368 secure adjustable block 312, set screws 370, 372 and 374 secure adjustable block 314, and set screws 375, 376 and 378 secure adjustable block 316. The adjustable block and set screw arrangement allow the support frame 336 to be fixed in a wide variety of positions over a desired workpiece 354.

Figure 6:
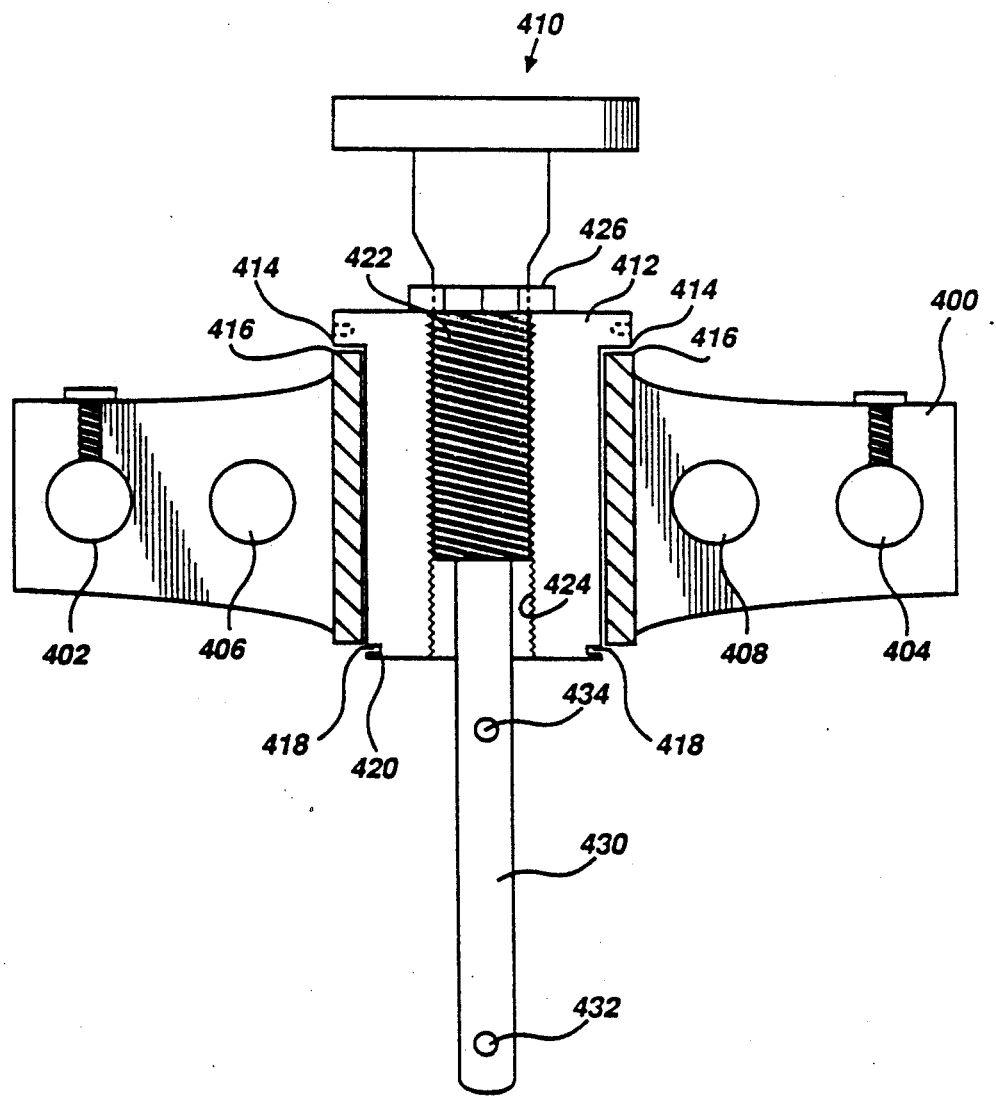
FIG. 6 is a partial cross-sectional view of the slidable gantry assembly of the present invention showing the interface of the vertical adjustable height member and bearing member within the gantry assembly.

A gantry member 400 slidably receives either one of the horizontal support member pairs, either horizontal supports 302, 304 or 306, 308 in bores 402, 404, or 406, 408 which are most clearly shown in FIG. 6. The respective horizontal support members engage the respective pairs of bores depending on the size and configuration of a desired workpiece. The gantry member 400 travels the full extension of the respective horizontal support members, bounded on either side by the respective adjustable block members.

A rotatable vertical support member 410 is disposed in the approximate midsection of the gantry member 400 as is most clearly seen in FIGS. 3 and 6. The rotatable vertical support member 410 is disposed in an orientation which is substantially parallel with respect to the vertical support members 338, 340, 342, and 348. A bearing member 412 is disposed between the vertical support member 410 and the gantry 400 to permit free rotation of the vertical support member 410 within the gantry 400. The bearing member 412 is retained within the gantry 400 at the uppermost end by a horizontally extending verge 414 which engages an opposing edge 416 of gantry member 400 At the bottom of bearing 412, a retaining ring 418 engages concentric groove 420 to prevent vertical movement of bearing 412 within gantry 400. A threaded shaft portion 422 of rotatable vertical support member 410 is received in a similarly threaded concentric aperture 424 of bearing member 412 to permit adjustment of the vertical position of the rotatable vertical support member 410 within the bearing 412 and with respect to gantry member 400. Once a desired position for the rotatable vertical support member 410 within bearing 412 is realized, it is clamped in position with locking nut 426.

The rotatable vertical support member 410 further includes a spindle portion 430 which includes apertures 432, 434 wherein aperture 432 is disposed at the distal end of spindle portion 430 and aperture 434 is disposed adjacent to and beneath the bottom of bearing 412. A support beam 436, most clearly seen in FIG. 3, is pivotally attached to spindle portion 430 with fastener 438 which engages aperture 432 of spindle portion 430. The support beam 436 may suitably be formed of a solid inverted "T" channel section, it may be formed with two opposing inverted "L" channel sections or in the preferred form shown in FIGS. 3 and 11, it may be formed with an inverted "U" shaped channel having horizontal flanges 452a, 452b wherein the respective horizontal flanges 452a, 452b form slide guides for receiving and supporting a slidable block 450.

Figure 7:
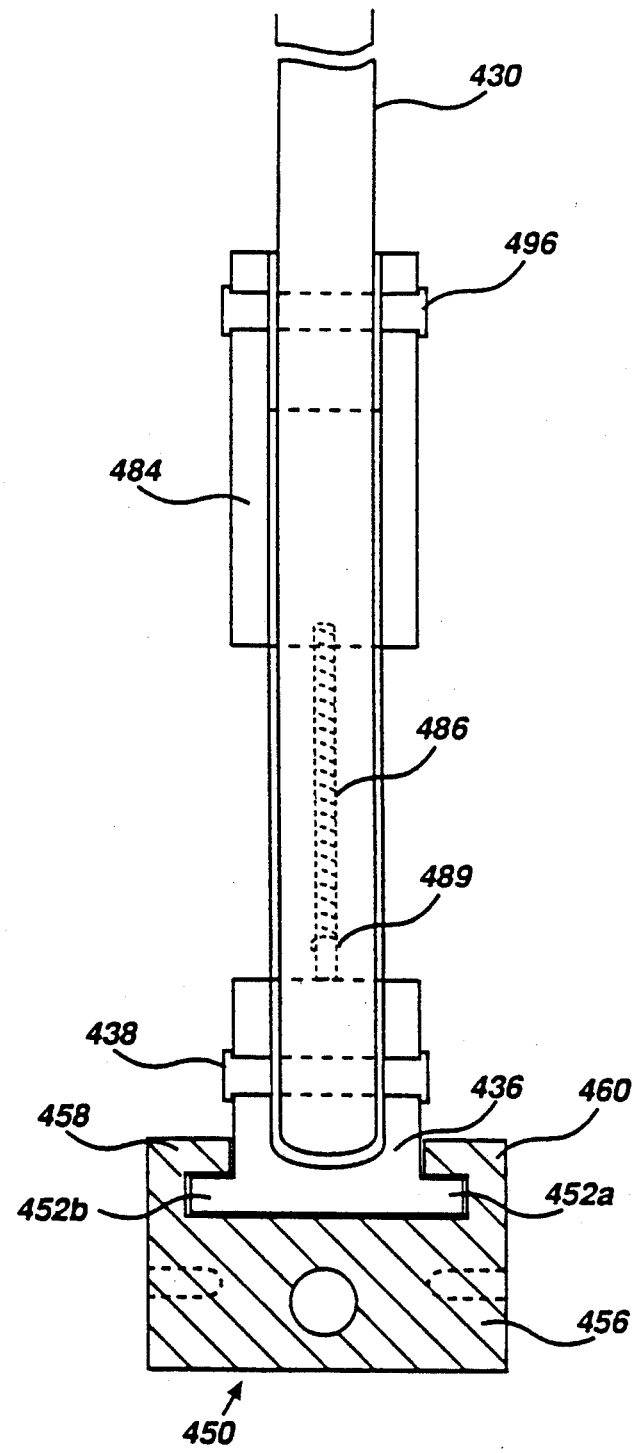
FIG. 7 is a cross-sectional view of the beam member and slidable block assembly of the present invention.
Figure 8A:
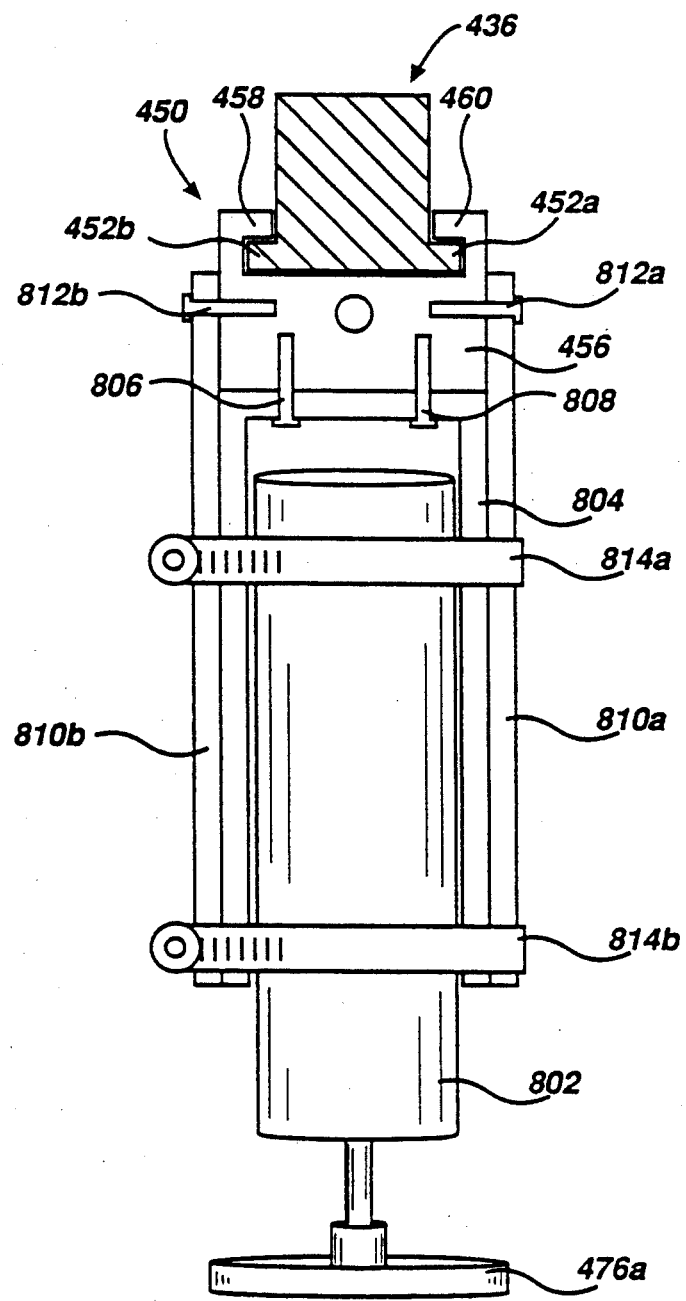
FIG. 8A is a cross-sectional view of one mounting apparatus for the slidable router assembly of the present invention.
Figure 8B:
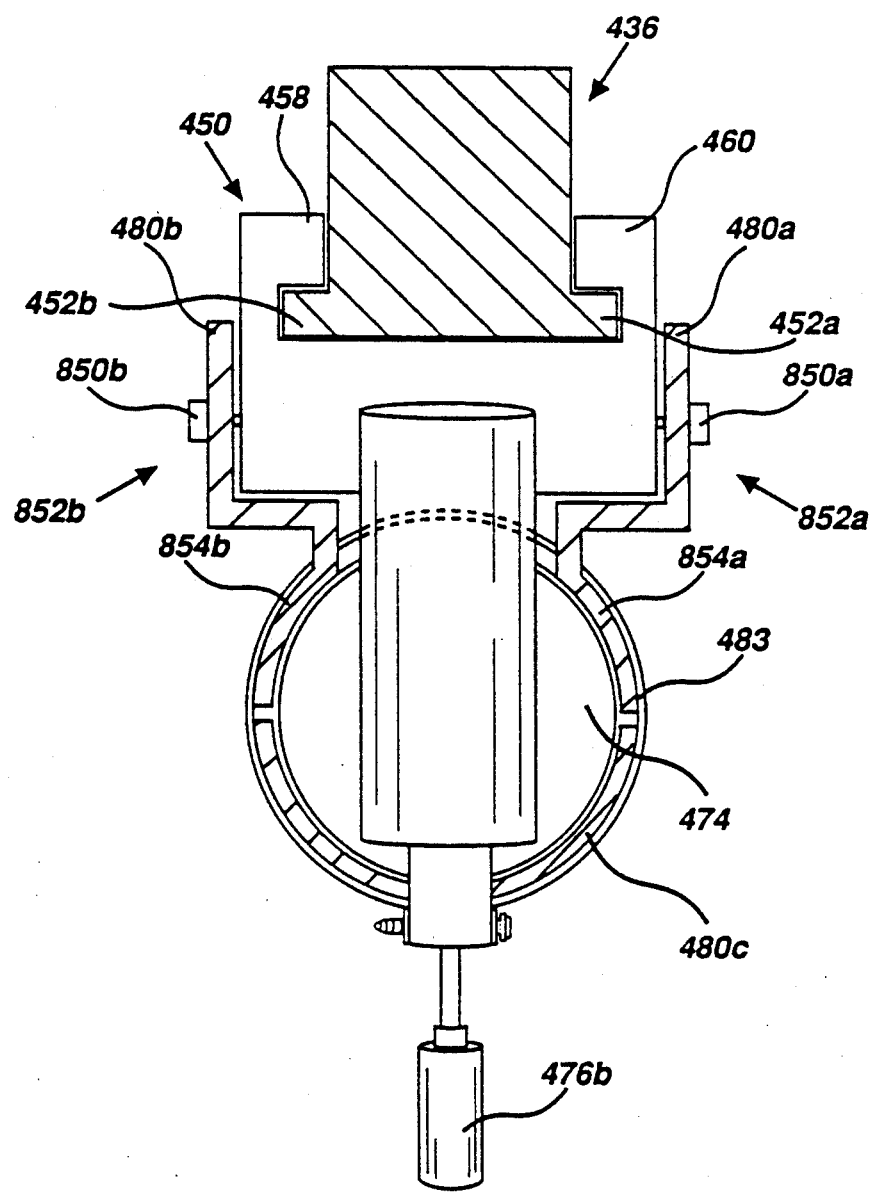
FIG. 8B is a cross-sectional view of an alternate mounting apparatus for the slidable router assembly of the invention.

The slidable block 450 is comprised of a body 456 and a plurality of inwardly directed "L" shaped flanges 458, 460 which slidably conform to the horizontal flanges 452a, 452b of support beam 436 as most clearly seen in FIGS. 7, 8A and 8B. The slidable block 450 is supported and guided by support beam 436 and travels the length of the support beam 436 bounded at either end by locking collars 464, 466 as is most clearly seen in FIG. 3. The locking collars receive the support beam 436 in apertures which conform in shape to the outer shape of support beam 436 and are secured in position with set screws 468, 470.

The slidable block 450 is adapted to support a cutting tool 474 which may typically be an air or electrically powered router which drives a cutting disk 476a. In the preferred practice of the present invention, the cutting disk would typically comprise a diamond cutting barrel blade used when preparing composite materials for repair The cutting tool 474 may typically be attached to the slidable block 450 by means of a flange and clamping means shown in FIG. 3 and in FIGS. 8A or 8B. Those skilled in the art will appreciate that cutting tool and the flange and clamping means may encompass a wide assortment of arrangements all of which will be readily apparent to a person of ordinary skill in the art.

The support beam 436 is further coupled to the spindle 430 with an adjustment arm 480 which is pivotally coupled to the spindle 430 with a fastener 490 which is coupled through aperture 434. The adjustment arm 480 may be comprised of two sections; a support post 484 and a threaded rod 486. The threaded rod 486 engages the support post 484 which is attached to the spindle 430 The other end of threaded rod 486 is coupled to a receiving flange and collar arrangement 489 wherein the receiving flange and collar arrangement 489 is pivotally attached to the support beam 436 with fastener 492. The position of the receiving flange and collar arrangement 489 on the threaded rod is adjusted with a threaded nut 488 which engages the threaded shaft 486 wherein rotating the threaded nut 488 advances the receiving flange and collar arrangement 489 along the threaded shaft 486. Other means of providing a variable length arm will be readily apparent to a person of ordinary skill in the art.

Regardless of the means used to provide a variable length arm, the length of the variable length arm 480 or the position of the receiving flange and collar arrangement 489 on threaded shaft 486 determines the angular position of the cutting tool 474 relative to the workpiece 354. Therefore, by adjusting the virtual length of the adjusting arm 480 and thus the angle of support arm 436, the vertical position of the rotatable vertical support member 410 within the gantry 400, the angular position of the rotatable vertical support member 410, the position of the gantry 400 on the respective horizontal support members and the position of the slidable block 450 on support beam 436, the present invention can produce cuts of virtually any dimension and depth in virtually any type of material.

Referring again to FIG. 3, in addition to the components described above, the present invention includes a means for controlling the position of the slidable block 450 on the support shaft 436. In accordance with the present invention, a screw shaft 500, supported on either end by supports 502, 504 threadably engages the slidable block 450. The threaded shaft 500 is further coupled to a handle assembly 506 wherein the lateral position of the slidable block 450 on the support shaft 436 advances or retreats based on the rotation of screw shaft 500. The performance of the screw shaft 500 and the slidable block 450 may be enhanced with ball bearing interfaces (not shown) which are well known.

Each of the respective members described above may be constructed with a variety of materials including steel, aluminum or a variety of plastic materials.

The present invention further includes means for releasably attaching the vertical support members 338, 340, 342, 344 to workpiece 354. The releasable attaching means suitably comprises suction cups 520A, 520B, 520C and 520D which are coupled to a vacuum source through hoses 524A and 524B. When a vacuum is applied to the respective suction cups, the present invention is securely attached to the workpiece 354. The respective suction cups include respective coupling means 522A, 522B, 522C and 522D which are pivotally attached to flanges 533, 534, 536 and 538 disposed at the ends of the respective vertical support members. The pivotal attachment of the respective suction cups and vertical support members allow the present apparatus to conform to workpieces of virtually any configuration.

The present invention is adapted for use with a wide variety of cutting tool arrangements one of which is shown in FIG. 8A. In this aspect of the present invention, a vertically oriented cutting tool or router housing 802 is attached to the slidable block 450. The interface between the cutting tool housing 802 and the slidable block 450 is provided by an adapter collar 804 which is attached to the slidable block 450 with fasteners 806, 808. The adapter collar 804 is configured such that the internal cavity of the adapter collar 804 substantially conforms in shape to the external shape of the cutting tool housing 802. Further structural integrity may be provided by support flanges 810a and 810b which are secured to the slidable block 450 with fasteners 812a and 812b, respectively. The support flanges 810a and 810b extend perpendicularly with respect to the slidable block 450 and are coextensive with the adapter collar 804. The adapter collar 804 and the support flanges 810a and 810b engage the cutting tool housing 802a with a friction fit and the cutting tool housing is preferably secured in position with clamping means 814a and 814b. The clamping means 814a and 814b may suitably comprise conventional hose clamps although a number of other clamping means may be employed in this application.

Referring now to FIG. 8B, the preferred apparatus for attaching a cutting tool to the slideable block 450 is shown. In this aspect of the present invention, a horizontally oriented cutting tool 474 is coupled to the slidable block with support members 480a, 480b and 480c. Support members 480a and 480b are attached to slidable block 450 with fasteners 850a and 850b, respectively. Each of the respective support members 480a and 480b are configured with a portion 852a and 852b, respectively, which conforms substantially in shape to the shape of slidable block 450 and a portion 854a and 854b, respectively, which conforms in shape to the shape of cutting tool housing 474. The support member 480c is also configured to conform in shape to the shape of cutting tool housing 474. Each of the respective support members 480a, 480b and 480c are secure to the cutting tool housing 474 with clamping means 481, 483 which may suitable comprise conventional hose clamps or any other type of concentric clamping means.

Referring now to FIG. 9, the vertical support member coupling means 532, 534, 536 and 538 are shown. The vertical support member coupling means 532, 534, 536 and 538 comprise a body 902 and a support flange 904. The body 902 is configured with a socket 906 which is adapted receive the terminal end of each respective vertical support member. The socket 906 is configured to be concentric and coextensive with the terminal ends of the vertical support members and may be fixed in place with a fastener or with an appropriate adhesive. The support flange 904 extends downward from the bottom surface of body 902 and includes a curved verge 908 which permits rotation of the support flange 904 about the axis defined by aperture 910 when the support flange 904 is mated with the associated suction assemblies 520a, 520b, 520c and 520d. This aspect of the present invention allows the respective suction members to conform to the surface of virtually any type of workpiece to allow a positive attachment by the respective suction members.

FIGS. 10A through 10C show top, end and side views of the slidable block 450. The slidable block 450 includes a body portion 456 having a width W3, an overall height H1, and an overall length L1. The width W3 may virtually any width which may be selected to accommodate a desired cutting tool housing. The length "L1" is also selected according to this criteria. The selection of the height H1 is equally flexible dependant primarily on providing enough area to accommodate the "L" shaped flanges 458, 460 and the bore 1008. The bore 1008 is provided with a diameter of D1 and is adapted to receive the threaded shaft 500 which interfaces with the threaded portion 1010. The "L" shaped flanges 458, 460 include a vertical portion 1012, 1014, respectively, having a height H2 which corresponds to the thickness of flanges 452a, 452bThe "L" shaped flanges further include a horizontal portion 1016, 1018, respectively, having a thickness H3, and which extend inwardly, creating an aperture having a width W6 which corresponds to the width of the body of support beam 436. The horizontal portions 1016, 1018 provide lip surfaces 1020, 1022 which restrict the movement of the slidable block 450 to a lateral direction along support beam 436 and which provide a support interface for the selected cutting tool.

Figure 12A:
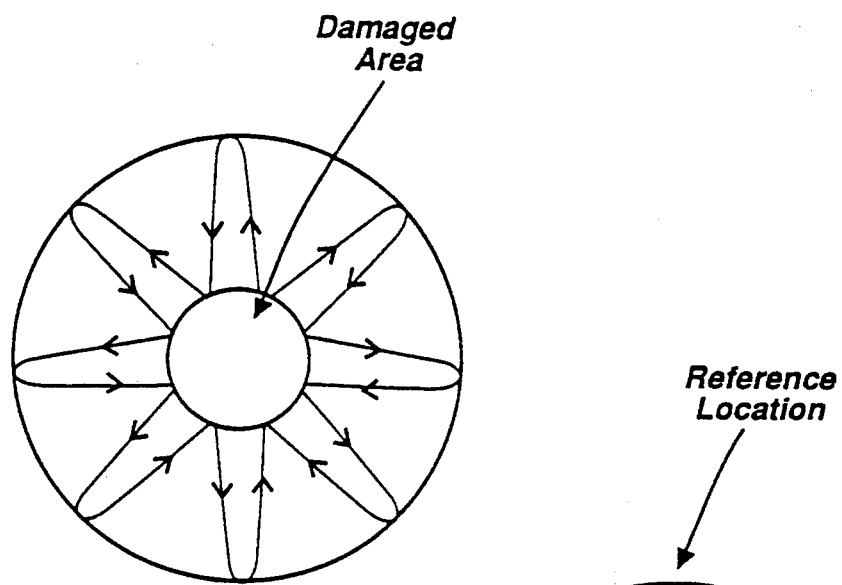
FIGS. 12A through 12C are top plan views detailing alternate cutting paths which may be generated with the mechanical scarfing apparatus of the present invention.
Figure 12B:
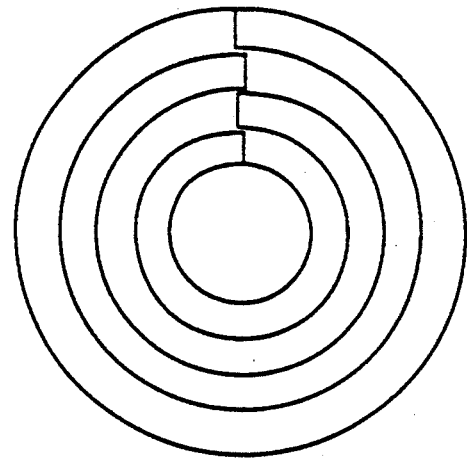
Figure 12C:
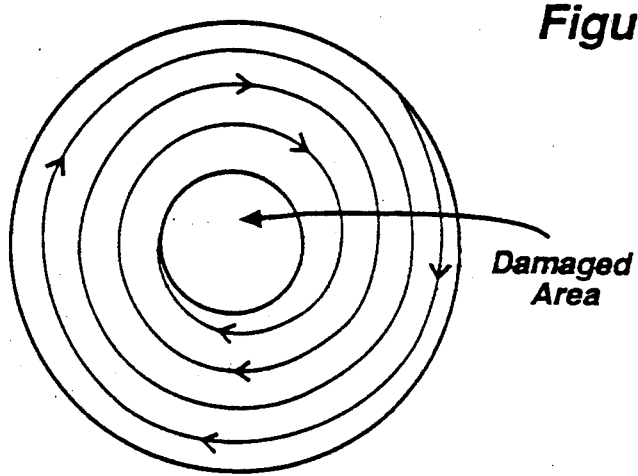

Referring now to FIGS. 12A and 12B, while the present invention is adapted to provide cutting paths in virtually any direction and angle, experimental results have shown that several cutting paths provide superior results. In the path shown in FIG. 12A, the cutting tool is guided along a "star" pattern wherein the direction of travel of the cutting tool is reversed at the inner and outer boundaries of the cutting path and continues until the cut is complete. In an alternative cutting path shown in FIG. 12B, the cutting tool is guided along a circular path wherein the radius of the circular path is stepped at some reference location. The cutting paths of FIGS. 12A and 12B are particularly useful in manually controlled applications. In yet another alternative path, shown in FIG. 12C, the cutting tool is guided along a spiral path beginning at the outer limit of the cutting region and terminating at the damaged region. While the present invention has been described in the context of manually controlling the path of the cutting tool, the present apparatus is adaptable for use with well known computer control techniques which can readily generate the cutting path of FIG. 2C, or alternate paths which may be advantageous for particular applications.

In summary, a mechanical scarfing apparatus capable of producing cuts of virtually any depth and shape has been described. While the present invention has been described in the context of a preferred embodiment, other uses and embodiments will be apparent to a person of ordinary skill in the art without departing from the spirit and scope of the present invention. All of such embodiments are intended to fall within the scope of the appended claims.

I claim:

1. An apparatus for producing a controller taper cut in a workpiece, comprising:
   a plurality cross support members;
   a plurality of vertical support members coupled to said cross support members said vertical support members for supporting said cross members in a fixed position over said workpiece;
   a gantry member slidably disposed on said horizontal support members;
   a rotatable vertical support member disposed within said gantry member in a position which is substantially parallel with respect to said plurality of vertical support members wherein said rotatable vertical support member includes means for adjusting the vertical position of said rotatable vertical support member within said gantry member;

a support beam pivotally attached to the distal end of the rotatable vertical support member at the approximate midsection of said support beam;

an adjustment member pivotally attached to the approximate mid-section of said rotatable vertical member and one end of the support beam for controlling the angular relationship of said support beam with respect to the cross axis defined by the cross support members;

a cutting tool means coupled to a mounting means slidably disposed on the support beam for moving the cutting tool means along the support beam.

2. The apparatus of claim 1 wherein said plurality of said vertical support members further includes means for releasably attaching said vertical support members to said workpiece.

3. The apparatus of claim 2 wherein said means for releasably attaching said vertical support members comprises suction cups coupled to a vacuum source.

4. The apparatus of claim further including locking collars disposed on opposing ends of said support beam for limiting the movement of said mounting means on said support member.

5. The apparatus of claim 1 further including means for controlling the lateral movement of said mounting means along said support beam.

6. The apparatus of claim 5 wherein said means for controlling lateral movement comprises a threaded shaft, disposed in a orientation which is substantially parallel to said support beam wherein said threaded shaft is rotatably attached to said support beam and engages a threaded aperture in said mounting means.

7. The apparatus of claim 1 wherein said cutting tool comprises a router and a cutting bit.

8. The apparatus of claim 1 further including bearing means disposed between said rotatable vertical support means and said gantry means.

* * * * *

UNITED STATES PATENT AND TRADEMARK OFFICE
CERTIFICATE OF CORRECTION

PATENT NO. : 4,987,700

DATED : January 29, 1991

INVENTOR(S) : Everett A. Westerman; Phillip E. Roll

It is certified that error appears in the above-identified patent and that said Letters Patent is hereby corrected as shown below:

In column 8, claim 1, line 55, please delete "controller" and substitute therefor --controlled--.

In column 10, claim 4, line 4, after "claim", please insert --1--.

Signed and Sealed this

Twenty-third Day of June, 1992

Attest:

DOUGLAS B. COMER

*Attesting Officer*     *Acting Commissioner of Patents and Trademarks*